United States Patent
Charbel et al.

(10) Patent No.: US 8,011,558 B2
(45) Date of Patent: Sep. 6, 2011

(54) TURNTABLE WELDING METHOD WITH LIGHT CURTAIN PROTECTION

(75) Inventors: George Charbel, Bellefontaine, OH (US); Yoshinori Ishihata, Dublin, OH (US); Julia Zoldak, Rushsylvania, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/749,614

(22) Filed: Mar. 30, 2010

(65) Prior Publication Data

US 2010/0187289 A1 Jul. 29, 2010

Related U.S. Application Data

(62) Division of application No. 12/196,748, filed on Aug. 22, 2008, now Pat. No. 7,810,697.

(51) Int. Cl.
*B23K 20/00* (2006.01)
(52) U.S. Cl. .......................................... 228/101; 901/42
(58) Field of Classification Search .................... 228/45, 228/101; 901/42, 41; 192/129 R, 129, 133; 340/679
See application file for complete search history.

(56) References Cited

U.S. PATENT DOCUMENTS

| | | | |
|---|---|---|---|
| 1,962,742 A | 10/1930 | Jongedyk | |
| 4,309,696 A | 1/1982 | Nagai et al. | |
| 4,677,274 A * | 6/1987 | Bisiach | 219/121.79 |
| 4,767,910 A | 8/1988 | Stevens, Jr. et al. | |
| 5,432,337 A | 7/1995 | Kato et al. | |
| 5,921,459 A | 7/1999 | Heraly et al. | |
| 6,047,634 A | 4/2000 | Futsuhara et al. | |
| 6,314,686 B1 * | 11/2001 | Scherer et al. | 52/36.1 |
| 6,403,918 B1 | 6/2002 | Fields, Jr. et al. | |
| 6,435,397 B2 | 8/2002 | Angel | |
| 6,455,803 B1 | 9/2002 | Fields, Jr. et al. | |
| 6,479,786 B1 | 11/2002 | Fields, Jr. et al. | |
| 6,621,091 B2 * | 9/2003 | Pratt et al. | 250/559.33 |
| 6,651,867 B2 | 11/2003 | Angel | |
| 6,772,932 B1 * | 8/2004 | Halstead | 228/45 |
| 6,876,457 B2 | 4/2005 | Parstorfer et al. | |
| 6,907,318 B2 * | 6/2005 | Passmore et al. | 700/245 |
| 6,958,465 B2 | 10/2005 | Haberer et al. | |
| 7,238,916 B2 | 7/2007 | Samodell et al. | |
| 7,262,403 B2 | 8/2007 | Rieger | |
| 7,305,748 B2 | 12/2007 | Sprague et al. | |
| 7,322,510 B2 | 1/2008 | Kraus | |
| 7,368,702 B2 * | 5/2008 | Kudo et al. | 250/221 |
| 2005/0044700 A1 * | 3/2005 | Ghuman et al. | 29/791 |
| 2007/0235433 A1 * | 10/2007 | Osicki | 219/125.1 |
| 2008/0006675 A1 | 1/2008 | Kraus | |
| 2008/0021597 A1 | 1/2008 | Merte et al. | |

* cited by examiner

*Primary Examiner* — Kiley Stoner
*Assistant Examiner* — Carlos Gamino
(74) *Attorney, Agent, or Firm* — Rankin Hill & Clark LLP

(57) ABSTRACT

A robotic welding system and method includes multiple welding cells equidistantly spaced in a circular arrangement, multiple perimeter light curtains to provide safety protection around the welding cells, a turntable centrally located in the circular arrangement, and multiple welding robots attached to the turntable. The welding system and method further includes a first welding process and a second welding process whereby both the first welding process and the second welding process each include a primary welding operation and a secondary welding operation whereby the turntable rotates between the welding cells to perform the primary and secondary welding operations.

17 Claims, 7 Drawing Sheets

| LIMIT SWITCH/ LIGHT CURTAIN | POSITION OF WELDING ROBOTS | | | |
|---|---|---|---|---|
| | FIRST WELDING CELL 12-1 | SECOND WELDING CELL 12-2 | THIRD WELDING CELL 12-3 | FOURTH WELDING CELL 12-4 |
| LS-1 | ON | OFF | OFF | OFF |
| LS-3 | OFF | ON | OFF | OFF |
| LS-5 | OFF | OFF | ON | OFF |
| LS-7 | OFF | OFF | OFF | ON |
| 14-V1/14-H1 | ACTIVATED | DEACTIVATED | DEACTIVATED | DEACTIVATED |
| 14-V2/14-H2 | DEACTIVATED | ACTIVATED | DEACTIVATED | DEACTIVATED |
| 14-V3/14-H3 | DEACTIVATED | DEACTIVATED | ACTIVATED | DEACTIVATED |
| 14-V4/14-H4 | DEACTIVATED | DEACTIVATED | DEACTIVATED | ACTIVATED |
| LS-2 | OFF | ON | ON | ON |
| LS-4 | ON | OFF | ON | ON |
| LS-6 | ON | ON | OFF | ON |
| LS-8 | ON | ON | ON | OFF |
| 14-I1 | DEACTIVATED | ACTIVATED | ACTIVATED | ACTIVATED |
| 14-I2 | ACTIVATED | DEACTIVATED | ACTIVATED | ACTIVATED |
| 14-I3 | ACTIVATED | ACTIVATED | DEACTIVATED | ACTIVATED |
| 14-I4 | ACTIVATED | ACTIVATED | ACTIVATED | DEACTIVATED |

FIG. 5

| PROXIMITY SWITCH | POSITION OF WELDING ROBOTS | | | |
|---|---|---|---|---|
| | FIRST WELDING CELL 12-1 | SECOND WELDING CELL 12-2 | THIRD WELDING CELL 12-3 | FOURTH WELDING CELL 12-4 |
| 60-1 | ON | OFF | ON | OFF |
| 60-2 | OFF | ON | ON | OFF |
| 60-4 | OFF | OFF | OFF | ON |
| 60-P | ON | ON | OFF | ON |

FIG. 6

PAGE 1

PAGE 2

TURNTABLE WELDING METHOD WITH LIGHT CURTAIN PROTECTION

BACKGROUND

The present disclosure relates to a welding machine and more specifically, to a multi-cell robotic welding system and method wherein at least one welding robot is rotated, via a turntable, to each cell to perform a welding operation.

In a conventional robotic welding system typically a fixture containing components to be welded into a welded assembly are transported to a welding area so a welding robot or robots can perform a welding process. The welded assembly must be removed from the welding area so a subsequent fixture with components for a subsequent welded assembly can undergo the welding process. A disadvantage of this process is that the welding robot(s) is idle during the removal of the first fixture from the welding area and the placement of the subsequent fixture into the welding area. This in turn increases production time and costs.

Further, conventional robotic welding systems take up substantial floor space due to the arrangement of the welding robot with respect to the welding cells or stations. This leads to increased manufacturing costs due the substantial floor space required by the system.

SUMMARY

In accordance with one aspect, a method for welding multiple assemblies is provided that overcomes the above mentioned disadvantages. The method for welding multiple welding assemblies includes providing welding cells equidistantly spaced in a circular arrangement, light curtains positioned at a perimeter of the welding cells, a turntable having a rotating portion and a stationary portion, and at least one welding robot operatively attached to the rotating portion, programming a first welding process into a control system, loading a first welding assembly into a fixture in a first welding cell, rotating the rotating portion of the turntable such that the at least one welding robot is aligned with the first welding cell, performing a primary welding operation on the first welding assembly, removing the first welding assembly from the first welding cell, placing the first welding assembly in a buffer area, loading a second welding assembly into the fixture in the first welding cell, performing simultaneously, the primary welding operation on the second welding assembly, and placing the first welding assembly in a fixture in a second welding cell, rotating the rotating portion of the turntable such that the at least one welding robot is aligned with the second welding cell, performing simultaneously, a secondary welding operation on the first welding assembly, removing the second welding assembly from the first welding cell, placing the second welding assembly in the buffer area, and loading a third welding assembly in the fixture in the first welding cell.

Additional benefits and advantages will become apparent to those skilled in the art to which it pertains upon a reading and understanding of the following detailed specification.

BRIEF DESCRIPTION OF THE DRAWINGS

FIG. 5 is a chart showing the activation and deactivation of light curtains in conjunction with the position of the turntable.

FIG. 6 is a chart showing the operation of proximity switches in conjunction with the position of the turntable.

DETAILED DESCRIPTION

Figure 1:
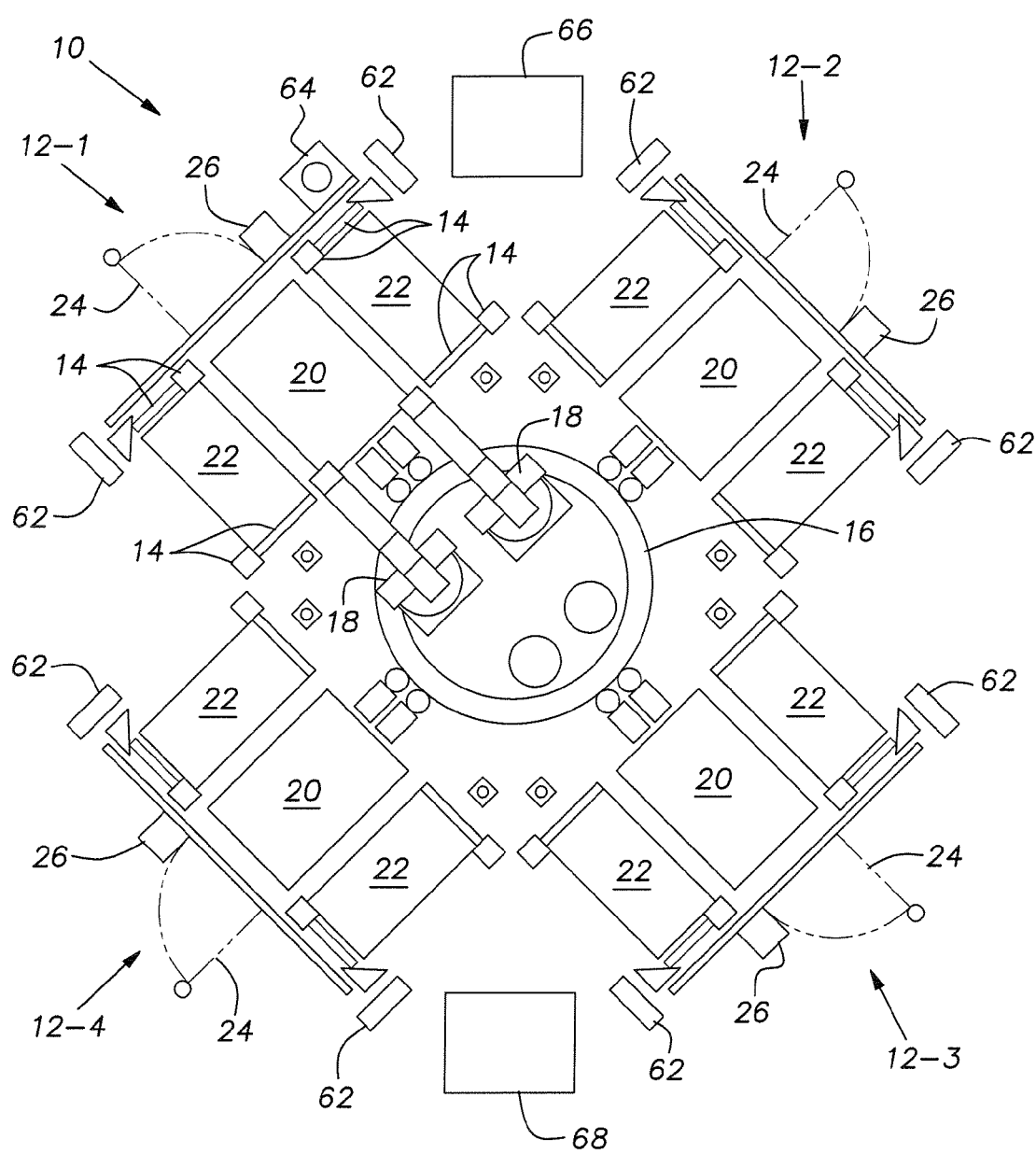
FIG. 1 shows an overview of a turntable welding system in a non-operational state.

Referring now to the drawings, FIG. 1 shows a schematic overview of a turntable welding system 10 that includes, multiple welding cells or stations 12-1, 12-2, 12-3, 12-4 (hereinafter collectively referred to as "welding cells 12-X"), multiple safety-light curtains 14, a turntable 16, and multiple welding robots 18.

The multiple welding cells 12-X are equidistantly spaced in a circular arrangement. In the embodiment shown in the figures there is a first 12-1, a second 12-2, a third 12-3, and a fourth 12-4 welding cell, thus, the welding cells 12-X are spaced in 90° intervals. It should be noted, however, that the number of welding cells may vary depending on the application. Thus, the embodiment shown in the figures is for illustrative purposes only and is not intended to limit the scope. The welding cells 12-X contain equipment commonly known in the art, such as, a lift hoist to lift and move heavy objects, safety fence, safety switches, etc. and will not be described in detail herein.

The four welding cells 12-X are divided into two pairs such that a first welding process P1 is performed over a first time period in the first pair of welding cells 12-X and a second welding process P2 is performed over a second time period in the second pair of welding cells 12-X whereby the first time period occurs at a different time period than the second time period. Specifically, the first welding process P1 is performed in the first 12-1 and second 12-2 welding cells during the first time period, and the second welding process P2 is performed in the third 12-3 and the fourth 12-4 welding cells during the second time period. Of course, the second welding process P2 can be performed in the first 12-1 and second 12-2 welding cells, and the first welding process P1 can be performed in the third and fourth welding cells. Each welding process P1, P2 is programmed into a control system to perform a particular welding process for a specific application whereby the first welding process P1 may be different than the second welding process P2.

Each welding process P1, P2 is divided into two separate welding operations. Specifically, the first welding process P1 has a primary welding operation P1-P that is performed in the first (or primary) welding cell 12-1, and a secondary welding operation P1-S that is performed in the second (or secondary) welding cell 12-2, whereby the primary welding operation P1-P is different than the secondary welding operation P1-S. Similarly, the second welding process P2 has a primary welding operation P2-P that is performed in the third (or primary) welding cell 12-3 and a secondary welding operation P2-S that is performed in the fourth (or secondary) welding cell 12-4, whereby the primary welding operation P2-P is different than the secondary welding operation P2-S.

Each welding cell 12-X includes a welding area 20 and two personnel work areas 22 located on either side of the welding area 20. The welding area 20 is the portion of the welding cell 12-X where welding robot performs a welding operation. The work areas 22 are the portion of the welding cell 12-X where personnel can enter the welding cell 12-X to make the appropriate changes to the welding area 20 when the welding cell 12-X is deactivated. Any reference to a front portion of either the welding area 20 or the work area 22 will be that portion closest to the turntable 16 and any reference to a rear portion of the welding area 20 or work area 22 will be that portion furthest from the turntable 16.

Still referring to FIG. 1, a pivoting gate 24 is located at the rear portion of each welding area 20 to allow personnel access to the welding area 20 to change out a fixture or a jig, as will be described further below. The gate 24 is electrically connected to a lockable E-stop pushbutton 26. The lockable E-stop pushbutton 26 serves two functions. First, the lockable E-stop pushbutton 26 serves as an emergency stop pushbutton that when activated prevents the robots 18 from operating in that specific welding cell 12-x. The robots 18, however, will operate in the other welding cells 12-x. Second the lockable E-stop pushbutton 26 serves as a lockout so that when the gate 24 is open the lockable E-stop pushbutton 26 can be locked out so that the welding robots 18 cannot enter that specific welding cell 12-x. The welding robots 18, however, can enter the remaining welding cells 12-x. In other words, each lockable E-stop pushbutton 26 operates only in conjunction with its corresponding welding cell 12-X. For example, if the gate 24 for the first welding cell 12-1 is open, the welding robots 18 can still operate in any remaining welding cell 12-X.

The welding cells 12-x are guarded by the light curtains 14 to safeguard the personnel workers from accidental injury. Briefly, light curtains are safety devices that are used to guard a manufacturing machine or area by detecting inadvertent entry into the area. Light curtains use an array of photoelectric sensors to detect the presence of an object, and typically consist of an infrared transmitter post and a corresponding infrared receiver post. When activated photoelectric transmitters from the first post project an array of synchronized-parallel infrared light beams to the receivers in the second post, thereby forming a safety curtain plane or detection zone. When an object interrupts one or more light beams a corresponding electrical safety circuit removes power from the guarded area to ensure safety. The light curtains 14 detect entry into the welding cells 12-X. Specifically, the light curtains 14 detect inadvertent entry into the activated welding cell 12-X.

Each welding cell 12-X includes multiple light curtains 14. Specifically, each welding cell 12-X includes a pair of perimeter vertical light curtains 14-V, a pair of perimeter horizontal light curtains 14-H, and an inner light curtain 14-I. It should be noted that the light curtains for a specific welding cell 12-X will be referenced hereinafter in the specification and on the drawings by simply adding the welding cell number to the end of the light curtain reference number. For example, the perimeter vertical light curtains for the first welding cell 12-1 will be referenced as 14-V1, the perimeter horizontal light curtains for welding cell 12-1 will be referenced as 14-H1, the inner light curtains for welding cell 12-1 will be referenced as 14-I1, etc. It should be further noted that because all the light curtains 14-V, 14-H, 14-I are identical for each welding cell 12-X only the light curtains in reference to the first welding cell 12-1 will be described and shown in the figures.

Figure 2:
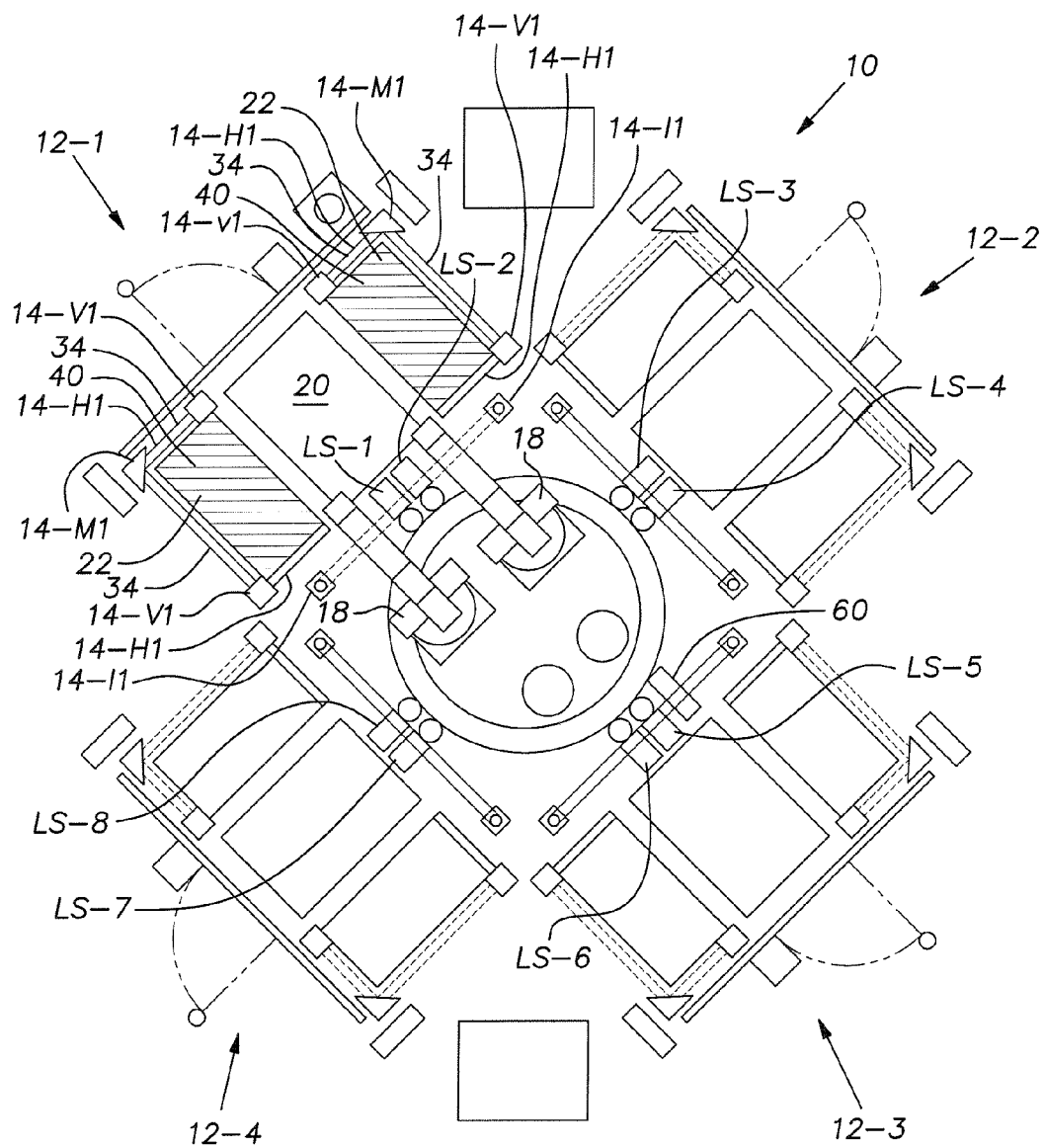
FIG. 2 shows an overview of the turntable welding system in an operational state.

Referring to FIG. 2 and to the first welding cell 12-1, each perimeter vertical light curtain 14-V1 has a vertical transmitter post and a vertical receiving post. The perimeter vertical light curtains 14-V1 create a vertical safety curtain 34 that is activated (shown as a solid line) when the welding robots 18 are performing a welding operation in the first welding cell 12-1. Each perimeter vertical light curtain 14-V1 further includes a corner mirror 14-M1. The corner mirror 14-M1 allows the infrared beam to be bent around a 90° corner from the transmitter post to the receiving post. The presence of the corner mirror 14-M1 allows multi-side protection without increasing the number of light curtains. Thus, as shown in FIG. 2, when activated the perimeter vertical light curtains 14-V1 detect entry into the welding cell 12-1 from the back portion of each work area 22 and from the side of each work area 22. It should be noted that when one set of perimeter vertical light curtains 14-V is activated for a given welding cell 12-X the other three sets of perimeter vertical light curtains 14-V are deactivated (as shown with dashed lines). Thus, in the embodiment shown in the figures, perimeter vertical light curtain 14-V1 for the first welding cell 12-1 is activated and perimeter vertical light curtains 14-V2, 14-V3, and 14-V4 for the second welding cell 12-2, the third welding cell 12-3, and the fourth welding cell 14-4 respectively are deactivated.

Still referring to FIG. 2 and to the first welding cell 12-1, each perimeter horizontal light curtain 14-H1 has a horizontal transmitter post located at the rear portion of the work area 22 and a horizontal receiver post located at the front portion of the work area 22. The perimeter horizontal light curtain 14-H1 creates a horizontal safety plane 40 that is located approximately 1-3 feet above the surface of the work area 22. The horizontal safety plane 40 is activated (shown as cross-section lines) when the welding robots 18 are performing a welding operation in the first welding cell 12-1. If the perimeter horizontal light curtain 14-H1 is activated while a personnel worker is in the work area 22 the welding robots 18 cannot start the welding operation in the first welding cell 12-1 because, as explained above, interruption of the light beam removes power from the guarded area. It should be noted that when one set of perimeter horizontal light curtains 14-H is activated for a given welding cell 12-X the other three sets of perimeter horizontal light curtains 14-H are deactivated (no cross-section lines shown). Thus, in the embodiment shown in the figures, perimeter horizontal light curtain 14-H1 for the first welding cell 12-1 is activated and perimeter horizontal light curtains 14-H2, 14-H3, and 14-H4 for the second welding cell 12-2, the third welding cell 12-3, and the fourth welding cell 14-4 respectively are deactivated.

Still referring to FIG. 2 and to the first welding cell 12-1, the inner light curtain 14-I1 is located adjacent to the turntable 16 and extends along the front portion of the welding area 20 and the two work areas 22. The inner light curtain 14-I1 also includes a vertical transmitter post and a vertical receiving post that creates a vertical safety curtain to detect access into the turntable area. The inner light curtain 14-I1, however, is deactivated (shown with dashed lines) when the perimeter vertical light curtains 14-V1 and the perimeter horizontal light curtains 14-H1 are activated. As shown in FIG. 2, the welding robots 18 extend between the vertical transmitter post and the vertical receiving post of the inner light curtain 14-I1. Thus, in order for the welding robots 18 to access the welding area 20 of the first welding cell 12-1 the inner light curtain 14-I1 must be deactivated. It should be noted that when one of the inner light curtains 14-I is deactivated for a given welding cell 12-X the other three inner light curtains 14-I are activated (shown with solid lines). Thus, in the embodiment shown in the figures, the inner light curtain 14-I1 for the first welding cell 12-1 is deactivated and the inner light curtains 14-I2, 14-I3, and 14-I4 for the second welding cell 12-2, the third welding cell 12-3, and the fourth welding cell 14-4 respectively are activated.

Figure 3:
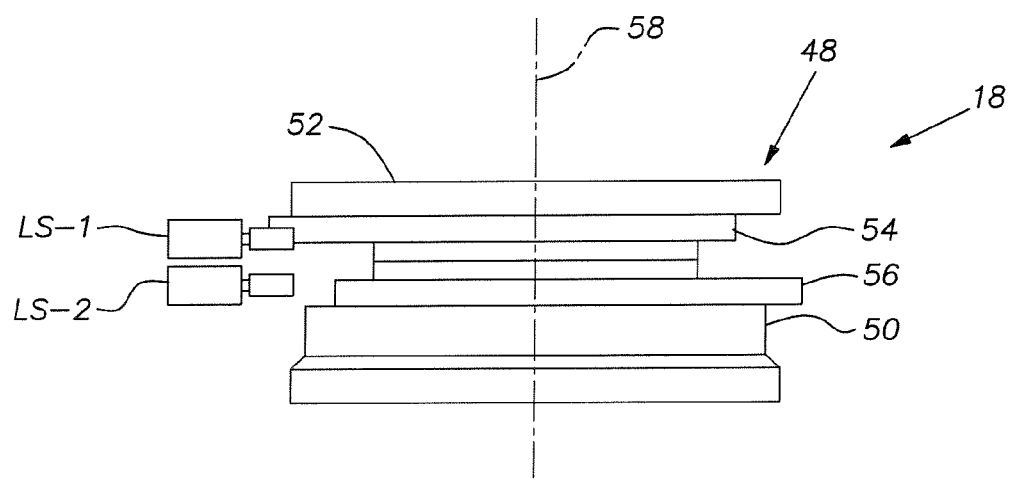
FIG. 3 is a side view of a turntable.
Figure 4:
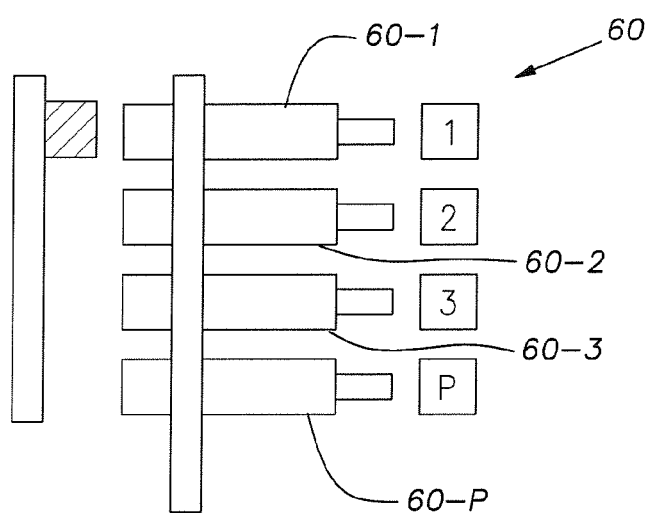
FIG. 4 is a schematic view of proximity switches.

Referring to FIGS. 2 and 3, the turntable 16 is motor driven and is positioned at a center of the circular arrangement of the welding cells 12-X. The turntable 16 includes a rotating portion 48 and a stationary base portion 50. The rotating portion 48 includes a top 52, a first activation/deactivation ring 54 (hereinafter "first ring 54") located between the top 52 and the base portion 50, and a second activation/deactivation ring 56 (hereinafter "second ring 56") located between the first ring 54 and the base portion 50. The top 52, the first ring 54, and the second ring 56 are mechanically connected together such that when the rotating portion 48 rotates about an axis of rotation 58, the top 52, the first ring 54, and the second ring 56 rotate together as a unit relative to the stationary base portion 50. Further, the rotating portion 48 can rotate in either a clockwise or counterclockwise direction.

The welding robots 18 are mounted to the top 52 of the rotating portion 48 and rotate with and in the same direction as the rotating portion 48. Thus, the rotating portion 48 of the turntable 16 rotates such that at least one of the welding robots 18 can be aligned with any one of the four welding cells 12-X to perform a welding operation. Further, the welding robots 18 may be mounted adjacent to each other such that both welding robots 18 can perform the welding operation in the same welding cell 12-X. It should be noted that the welding robots 18 are of the type commonly known in the art, such as but not limited to MIG welders, and will not be described herein. In the embodiment shown in the figures, there are two welding robots. The number of welding robots, however, may vary depending on the application. Thus, the embodiment shown in the figures is for illustrative purposes only and is not intended to limit the scope.

Referring to FIG. 3, although the first ring 54 and the second ring 56 both rotate about the axis of rotation 58 they are not concentric. In other words, the first ring 54 and the second ring 56 are circular in shape but are situated such that a center of the first ring 54 and a center of the second ring 56 are offset in opposite directions from the axis of rotation 58. Thus, one side of the first ring 54 extends further from the axis of rotation 58 of the rotating portion 48 than the opposite side. Similarly, one side of the second ring 56 extends further from the axis of rotation 58 of the rotating portion 48 than the opposite side. This allows the first ring 54 and the second ring 56 to engage limit switches, which activate and deactivate the light curtains 14, upon rotation of the rotating portion 48. Specifically, as the rotating portion 48 rotates the first ring 54 engages a first set of limit switches LS-1, LS-3, LS-5, and LS-7 to thereby activate and deactivate the perimeter vertical light curtains 14-V and the perimeter horizontal light curtains 14-H. Further, as the rotating portion 48 rotates the second ring 56 engages a second set of limit switches LS-2, LS-4, LS-6, and LS-8 to thereby activate and deactivate the inner light curtains 14-I.

Referring to FIGS. 2 and 3, the limit switches are equidistantly spaced around the turntable 16 such that the limit switches are arranged where LS-1 and LS-2 correspond to the first welding cell 12-1, LS-3 and LS-4 correspond to the second welding cell 12-2, LS-5 and LS-6 correspond to the third welding cell 12-3, and LS-7 and LS-8 correspond to the fourth welding cell 12-4. For simplicity, only limit switches LS-1 and LS-2 that corresponds to the first welding cell 12-1 will be described.

FIG. 5 illustrates in table form when the light curtains 14-V1, 14-H1, 14-I1 are activated and deactivated. When the welding robots 18 are positioned in the first welding cell 12-1, the first ring 54 engages limit switch LS-1 and simultaneously disengages limit switches LS-3, LS-5, and LS-7. Accordingly, limit switch LS-1 activates perimeter vertical light curtain 14-V1 and perimeter horizontal light curtain 14-H1. Thus, the perimeter around the first welding cell 12-1 is guarded by perimeter vertical light curtain 14-V1 and the perimeter horizontal light curtain 14-H1. In addition, limit switches LS-3, LS-5, and LS-7 deactivate perimeter vertical light curtains 14-V2, 14-V3, and 14-V4, and the perimeter horizontal light curtains 14-H2, 14-H3, and 14-H4 respectively. Thus, personnel can access the welding area 20 and the work areas 22 for the second 12-1, third 12-3, and fourth 12-4 welding areas. Simultaneously, the second ring 56 disengages limit switch LS-2 and engages limit switches LS-4, LS-6, and LS-8. Accordingly, limit switch LS-2 deactivates inner light curtain 14-I1 and limit switches LS-4, LS-6, and LS-8 activate inner light curtains 14-I2, 14-I3, and 14-I4 respectively. Thus, the welding robots 18 have access to the first welding cell 12-1 and the perimeter around the turntable 16 is guarded by inner light curtains 14-I2, 14-I3, and 14-I4.

Referring to FIGS. 2, 3 and 6, the turntable welding system 10 further includes four proximity switches 60-1, 60-2, 60-4, and 60-P (hereinafter collectively referred to as proximity switches "60") located adjacent to the turntable 16. The proximity switches 60 operate on a binary format to detect a general position of the rotating portion 48 of the turntable 16. Thus, activation of proximity switch 60-1 indicates that the rotating portion 48 of the turntable 16 is positioned such that at least one welding robot 18 is aligned with the first welding cell 12-1 to perform a welding operation. Similarly, activation of proximity switch 60-2 indicates that the rotating portion 48 of the turntable 16 is positioned such that at least one welding robot 18 is aligned with the second welding cell 12-2 to perform a welding operation. When both proximity switches 60-1 and 60-2 are activated the rotating portion 48 of the turntable 16 is positioned such that at least one welding robot 18 is aligned with the third welding cell 12-3 to perform a welding operation. Finally, when proximity switch 60-4 is activated the rotating portion 48 of the turntable 16 is positioned such that at least one welding robot 18 is aligned with the fourth welding cell 12-1 to perform a welding operation. Proximity switch 60-P is used for parity. In other words, proximity switch 60-P will turn on when there is only one other proximity switch turned on and will remain off when two other proximity switches are turned on. Thus, the number of proximity switches 60 that will be turned on when the welding robots 18 are positioned at any given welding cell 12-X will be even (even parity) and more specifically will be two, as shown in the table in FIG. 6.

Referring to FIG. 1, the turntable welding system 10 further includes multiple start pushbuttons 62, and a main power pushbutton 64. There are two start pushbuttons 62 per welding cell 12-X. The start pushbuttons 62 are located at the rear portion of the work area 22 and include an E-stop feature. Each start pushbutton 62 must be activated by a personnel worker in order for the welding robots 18 to operate in that given welding cell 12-X.

The main power pushbutton 64 controls the power to the entire turntable welding system 10 and also includes an E-stop feature. In the embodiment shown in the figures the main power pushbutton 64 is located at the rear portion of the work area 22 of welding cell 12-1. The main power pushbutton 64, however, can be positioned at any location around the perimeter of the turntable welding system 10.

Operation of the turntable welding system 10 will now be described in reference to the first welding process P1, which corresponds to the first welding cell 12-1 and the second welding cell 12-2. To effectively illustrate the advantage of the welding system the following will be assumed;

A first welding assembly has already undergone the primary welding operation P1-P in the first welding cell 12-1 and is located in the second welding cell 12-2.

The first welding assembly is currently undergoing the secondary welding process P1-S in the second welding cell 12-2.

A second welding assembly has also undergone the primary welding process P1-P in the first welding cell 12-1 and has been removed from the first welding cell 12-1 and placed in a buffer area 66 (shown in FIG. 1) located between the first welding cell 12-1 and the second welding cell 12-2.

A third welding assembly has been loaded into the first welding cell 12-1 waiting to undergo the primary welding operation P1-P of the first process P1. It should be noted that the loading of the third welding assembly into the first welding cell 12-1 occurred during the secondary welding operation P1-S to the first welding assembly in the second welding cell 12-2.

Thus, at this point in the first welding process P1, when the first welding assembly is in the second welding cell 12-2 undergoing the secondary welding operation P1-S, as explained above, perimeter vertical light curtain 14-V2 and perimeter horizontal light curtain 14-H2 are activated, and perimeter vertical light curtain 14-V1 and perimeter horizontal light curtain 14-H1 are deactivated. In addition, inner light curtain 14-I2 is deactivated and inner light curtain 14-I1 is activated.

Figure 7:
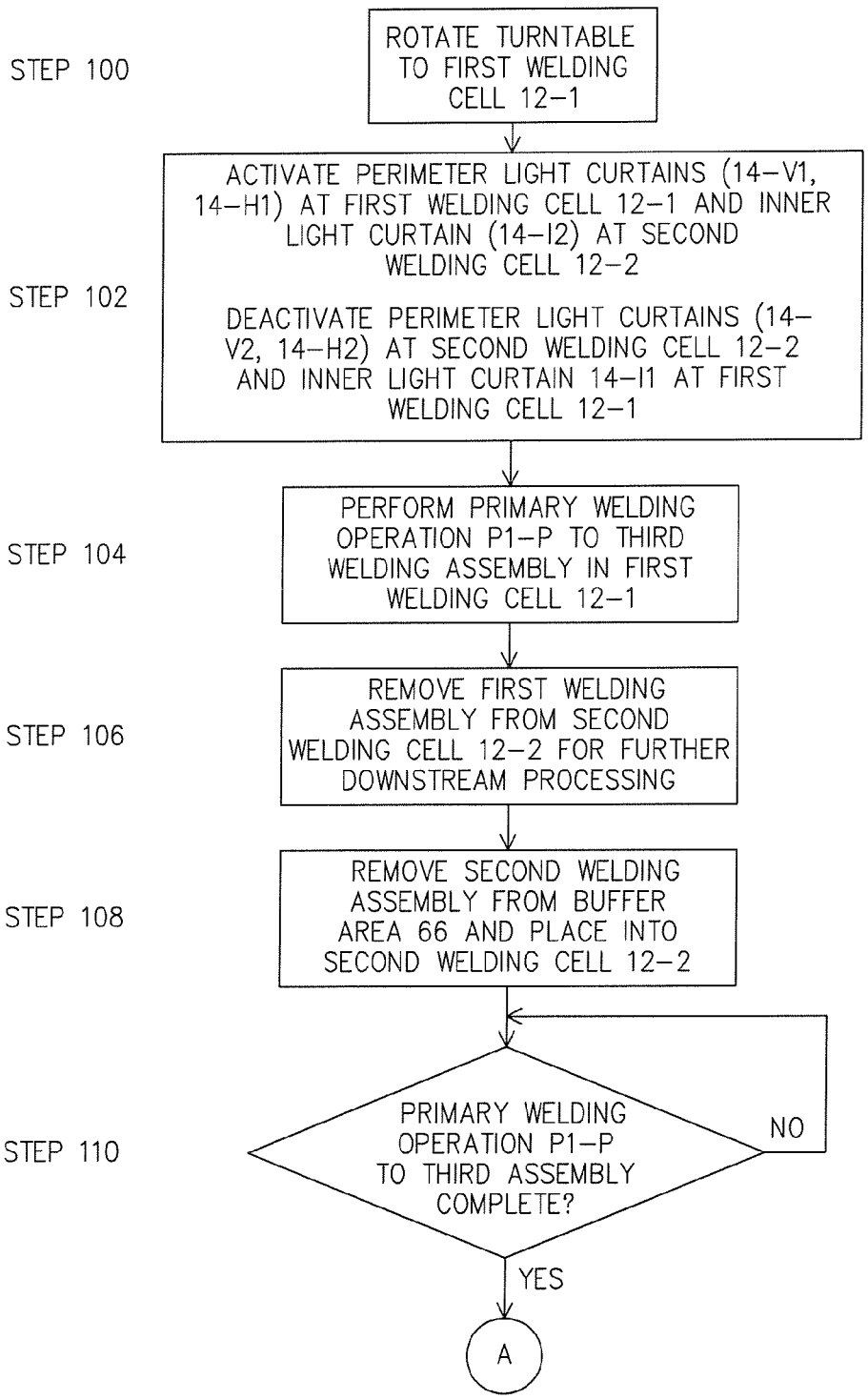
FIG. 7 is a flowchart showing the operation of the turntable welding system.
Figure 7:
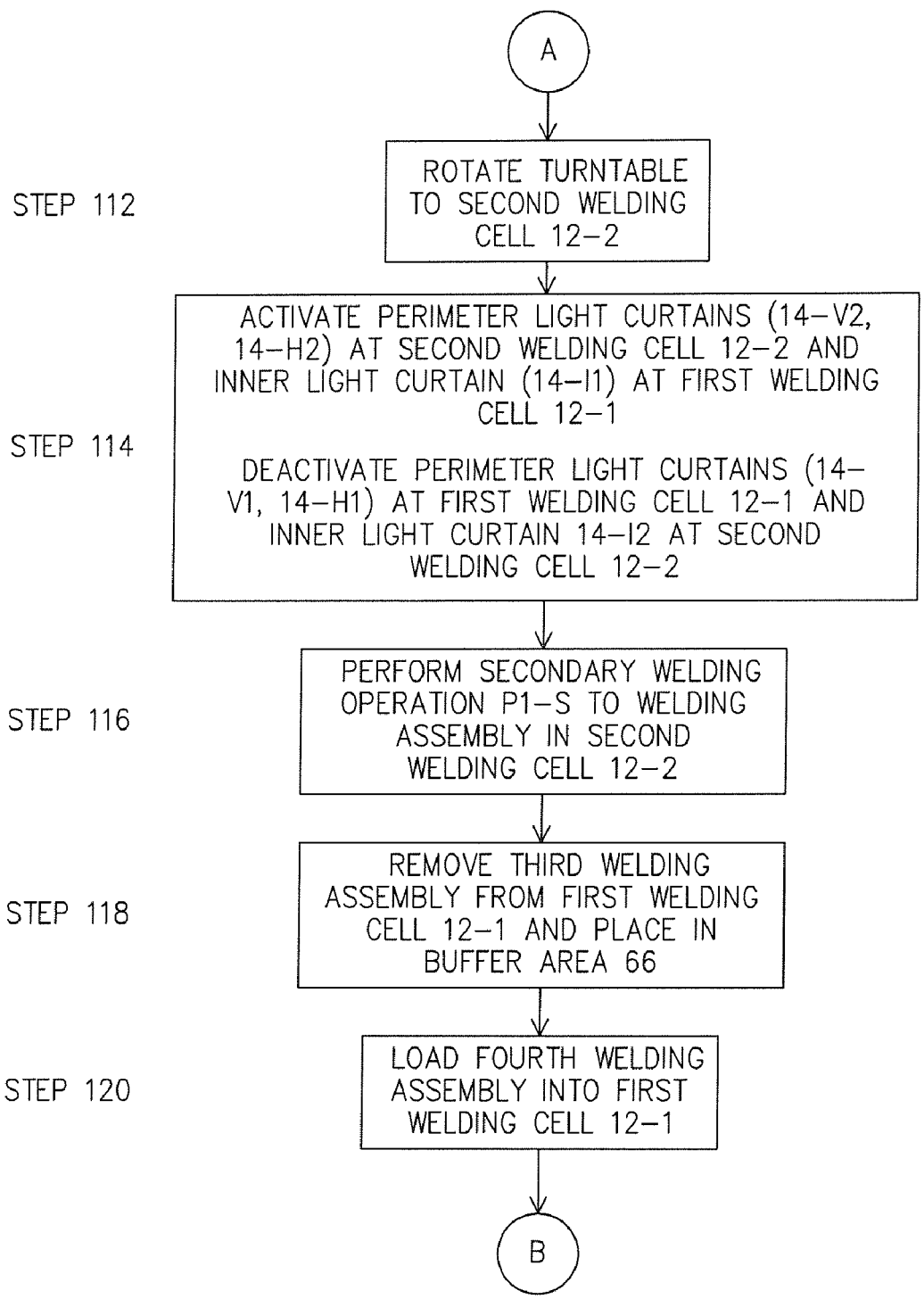
Figure 7:
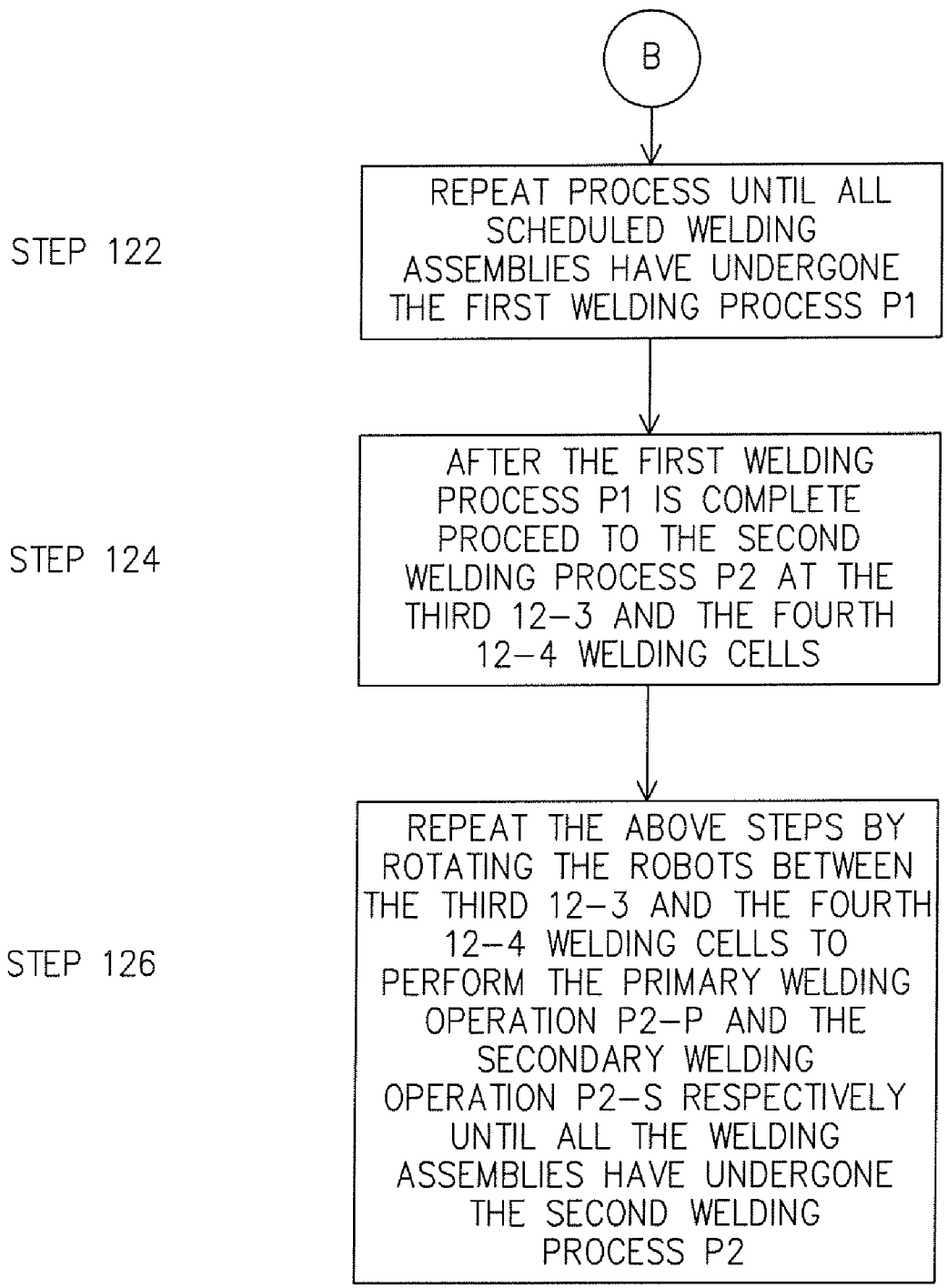

Referring now to the flow chart in FIG. 7, once the secondary welding operation P1-S to the first welding assembly is complete, the rotating portion 48 of the turntable 16 rotates to position the welding robots 18 at the first welding cell 12-1 to perform the primary welding operation P1-P to the third welding assembly (STEP 100). Perimeter vertical light curtain 14-V1 and perimeter horizontal light curtain 14-H1 at the first welding cell 12-1 are activated via limit switch LS-1 and inner light curtain 14-I1 is deactivated via limit switch LS-2 (STEP 102). In addition, perimeter vertical light curtain 14-V2 and perimeter horizontal light curtain 14-H2 at the second welding cell 12-2 are deactivated via limit switch LS-3 and inner light curtain 14-I2 is activated via limit witch LS-4 (STEP 102). The primary welding operation P1-P to the third welding assembly can now begin.

During the primary welding operation P1-P to the third welding assembly in the first welding cell 12-1 (STEP 104), the first welding assembly is removed from the second welding cell 12-2 for further processing (STEP 106). In addition, the second welding assembly is then removed from the buffer area 66 and placed in the fixture in the second welding cell 12-2 (STEP 108). Once the primary welding operation P1-P to the third welding assembly is complete (STEP 110) the rotating portion 48 of the turntable 16 rotates to position the welding robots 18 at the second welding cell 12-2 to perform the secondary welding operation P1-S to the second welding assembly (STEP 112). Again, perimeter vertical light curtain 14-V2 and perimeter horizontal light curtain 14-H2 at the second welding cell 12-2 are activated via limit switch LS-3 and the inner light curtain 14-I2 is deactivated via limit switch LS-4 (STEP 114). In addition, perimeter vertical light curtain 14-V1 and perimeter horizontal light curtain 14-H1 at the first welding cell 12-1 are deactivated via limit switch LS-1 to allow personnel workers to enter the first welding cell 12-1, and inner light curtain 14-I1 is activated via limit switch LS-2 to detect the entry of personnel workers into the turntable area (STEP 114).

During the secondary welding operation P1-S to the second welding assembly in the second welding cell 12-2 (STEP 116), the third welding assembly is removed from the first welding cell 12-1 and placed in the buffer area 66 (STEP 118). A fourth welding assembly is then loaded into the fixture in the first welding cell 12-1 waiting to undergo the primary welding operation P1-P (STEP 120). The above process is repeated until all the scheduled welding assemblies have undergone the first welding process P1 (STEP 122).

Once the first welding process P1 is complete the second welding process P2 will begin to process a different set of welding assemblies in the third 12-3 and fourth 12-4 welding cells (STEP 124). The second welding process P2 will undergo the process explained above until all the scheduled welding assemblies are complete (STEP 126).

The advantage of the above process is that production of the welding assemblies is not interrupted each and every time a welding assembly is removed or loaded into a welding cell 12-X. As illustrated above a welding operation is always in process in a first welding cell while a second welding cell is being prepared for another welding operation, which increases production and reduces manufacturing costs. Further, the footprint of the circular arrangement of the welding cells is compact, which makes the manufacturing area efficient for personnel workers to enter the welding cells and retrieve components to perform their functions. Still further, the addition of the light curtains reduces the number of physical barriers around the manufacturing area and specifically around the welding cells, which allows easy unobstructed access to the welding cells.

Still yet another advantage to the above process is that during operation of the first welding process P1 described above, all the perimeter light curtains (14-V3, 14-V4, 14-H3, 14-H4) located at the third 12-3 and the fourth 12-4 welding cells are deactivated. Thus, personnel workers can prepare the third 12-3 and fourth 12-4 welding cells for the second welding process P2 without disrupting the first welding process in the first 12-1 and second 12-2 welding cells. Similarly, during operation of the second welding process P2, all the perimeter light curtains (14-V1, 14-V2, 14-H1, 14-H2) located at the first 12-1 and the second 12-2 welding cells are deactivated. Thus, personnel workers can prepare the first 12-1 and second 12-2 welding cells for the first welding process P1 without disrupting the second welding process in the third 12-3 and fourth 12-4 welding cells.

Still yet another advantage to the above process is that additional work to a welding assembly located in the buffer area 66 can undergo further work without disrupting the flow of production. For example, additional hand welding, cleaning or placement of additional parts, etc. can be performed to the welding assembly while the welding assembly is in the buffer area 66. It should be noted that an additional buffer area 68 (shown only in FIG. 1) is located between the third 12-3 and the fourth 12-4 welding cells for use during the second welding process P2.

It should be noted that the terms "first welding process P1" and "second welding process P2" are used to simplify the explanation of the operation of the turntable welding system and are not intended to limit the scope. In other words, the welding process performed in the first 12-1 and second 12-2 welding cells may be one type of welding process for one type of welding assembly, and a subsequent welding process preformed in the first 12-1 and second 12-2 welding cells may be a different type of welding process for a different type of welding assembly. Similarly, the welding process performed in the third 12-3 and fourth 12-4 welding cells may be one type of welding process for one type of welding assembly, and a subsequent welding process preformed in the third 12-3 and fourth 12-4 welding cells may be a different type of welding process for a different type of welding assembly.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for welding multiple welding assemblies comprising:
providing welding cells equidistantly spaced in a circular arrangement, light curtains positioned at a perimeter of the welding cells, a turntable having a rotating portion and a stationary portion, and at least one welding robot operatively attached to the rotating portion;
programming a first welding process into a control system;
loading a first welding assembly into a fixture in a first welding cell;
rotating the rotating portion of the turntable such that the at least one welding robot is aligned with the first welding cell;
performing a primary welding operation on the first welding assembly;
removing the first welding assembly from the first welding cell;
placing the first welding assembly in a buffer area;
loading a second welding assembly into the fixture in the first welding cell;
performing simultaneously;

the primary welding operation on the second welding assembly; and placing the first welding assembly in a fixture in a second welding cell;

rotating the rotating portion of the turntable such that the at least one welding robot is aligned with the second welding cell;

performing simultaneously a secondary welding operation on the first welding assembly;

removing the second welding assembly from the first welding cell;

placing the second welding assembly in the buffer area; and loading a third welding assembly in the fixture in the first welding cell, wherein the rotating portion of the turntable rotates about an axis of rotation and includes a top portion, a first activation/deactivation ring having a center offset from the axis of rotation and positioned between the top portion and the stationary portion, and a second activation/deactivation ring having a center offset from the axis of rotation and positioned between the first activation/deactivation ring and the stationary portion, wherein the top portion, the first activation/deactivation ring, and the second activation/deactivation ring are mechanically connected together such that the top portion, the first activation/deactivation ring, and the second activation/deactivation ring rotate together about the axis of rotation relative to the stationary portion, and wherein the center of the first activation/deactivation ring is offset from the axis of rotation in a different direction than the center of the second activation/deactivation ring.

2. The method of claim 1, wherein prior to performing a primary welding operation on the first welding assembly, the method further comprises:

activating multiple light curtains positioned around a perimeter of the first welding cell;

deactivating a light curtain positioned between turntable and a front portion of the first welding cell;

deactivating multiple light curtains around a perimeter of the second welding cell; and activating a light curtain positioned between the turntable and a front portion of the second welding cell.

3. The method of claim 2, wherein prior to performing a secondary welding operation on the first welding assembly, the method further comprises:

deactivating the multiple light curtains positioned around the perimeter of the first welding cell;

activating the light curtain positioned between turntable and a front portion of the first welding cell;

activating the multiple light curtains around a perimeter of the second welding cell; and deactivating the light curtain positioned between the turntable and a front portion of the second welding cell.

4. The method of claim 3, wherein a plurality of first limit switches are equidistantly spaced around a perimeter of the turntable such that a limit switch from the plurality of first limit switches is positioned between each of the multiple welding cells and the first activation/deactivation ring, and wherein a plurality of second limit switches are equidistantly spaced around a perimeter of the turntable such that a limit switch from the plurality of second limit switches is positioned between each of the multiple welding cells and the second activation/deactivation ring.

5. The method of claim 4, wherein the first activation/deactivation ring engages the plurality of first limit switches to activate and deactivate the multiple light curtains positioned around the perimeter of the first welding cell and the second welding cell, and to activate and deactivate the light curtain positioned between the turntable and the front portion of the first welding cell and the front portion of the second welding cell.

6. The method of claim 5, wherein a plurality of proximity switches are provided between at least one of the multiple welding cells and the turntable, and wherein rotating the rotating portion of the turntable such that the at least one welding robot is aligned with the first welding cell includes:

rotating the rotating portion of the turntable;

engaging at least one of the plurality of proximity switches;

activating the at least one of the plurality of proximity switches;

detecting a position of the rotating part; and positioning the rotating part such that the at least one welding robot is aligned with the first welding cell.

7. The method of claim 6, wherein rotating the rotating portion of the turntable such that the at least one welding robot is aligned with the second welding cell includes:

rotating the rotating portion of the turntable;

engaging at least one of the plurality of proximity switches;

activating the at least one of the plurality of proximity switches;

detecting a position of the rotating part; and positioning the rotating part such that the at least one welding robot is aligned with the second welding cell.

8. The method of claim 7 further comprising:

programming a second welding process into a control system; and preparing a third welding cell and a fourth welding cell to perform the second welding process, wherein the second welding process includes a primary welding operation performed in the third welding cell, which is substantially different than the primary welding operation performed in the first welding cell, and a secondary welding operation performed in the fourth welding cell, which is substantially different than the secondary welding operation performed in the second welding cell.

9. A method for welding multiple welding assemblies comprising:

providing welding cells equidistantly spaced in a circular arrangement, multiple light curtains positioned at a perimeter of the welding cells, a turntable having a rotating portion and a stationary portion, at least one welding robot operatively attached to the rotating portion, and light curtains positioned between the turntable and the welding cells;

programming a first welding process into a control system;

loading a first welding assembly into a fixture in a first welding cell;

rotating the rotating portion of the turntable such that the at least one welding robot is aligned with the first welding cell;

performing a primary welding operation on the first welding assembly;

removing the first welding assembly from the first welding cell;

placing the first welding assembly in a buffer area;

loading a second welding assembly into the fixture in the first welding cell;

performing simultaneously;

the primary welding operation on the second welding assembly; and placing the first welding assembly in a fixture in a second welding cell;

rotating the rotating portion of the turntable such that the at least one welding robot is aligned with the second welding cell;

performing simultaneously a secondary welding operation on the first welding assembly;

removing the second welding assembly from the first welding cell;

placing the second welding assembly in the buffer area; and loading a third welding assembly in the fixture in the first welding cell, wherein during rotation of the rotating portion of the turntable, the rotating portion engages a plurality of limit switches that activate and deactivate the multiple light curtains positioned at the perimeter of the welding cells and the light curtains positioned between the turntable and the welding cells prior to the primary welding operation and the secondary welding operation.

10. The method of claim 9, wherein prior to performing a primary welding operation on the first welding assembly, the method further comprises:

activating multiple light curtains positioned around a perimeter of the first welding cell;

deactivating a light curtain positioned between turntable and a front portion of the first welding cell;

deactivating multiple light curtains around a perimeter of the second welding cell; and activating a light curtain positioned between the turntable and a front portion of the second welding cell.

11. The method of claim 10, wherein prior to performing a secondary welding operation on the first welding assembly, the method further comprises:

deactivating the multiple light curtains positioned around the perimeter of the first welding cell;

activating the light curtain positioned between turntable and a front portion of the first welding cell;

activating the multiple light curtains around a perimeter of the second welding cell; and deactivating the light curtain positioned between the turntable and a front portion of the second welding cell.

12. The method of claim 11, wherein the rotating portion of the turntable rotates about an axis of rotation and includes a top portion, a first activation/deactivation ring having a center offset from the axis of rotation and positioned between the top portion and the stationary portion, and a second activation/deactivation ring having a center offset from the axis of rotation and positioned between the first activation/deactivation ring and the stationary portion, wherein the top portion, the first activation/deactivation ring, and the second activation/deactivation ring are mechanically connected together such that the top portion, the first activation/deactivation ring, and the second activation/deactivation ring rotate together about the axis of rotation relative to the stationary portion, and wherein the center of the first activation/deactivation ring is offset from the axis of rotation in a different direction than the center of the second activation/deactivation ring.

13. The method of claim 12, wherein a plurality of first limit switches are equidistantly spaced around a perimeter of the turntable such that a limit switch from the plurality of first limit switches is positioned between each of the multiple welding cells and the first activation/deactivation ring, and wherein a plurality of second limit switches are equidistantly spaced around a perimeter of the turntable such that a limit switch from the plurality of second limit switches is positioned between each of the multiple welding cells and the second activation/deactivation ring.

14. The method of claim 13, wherein the first activation/deactivation ring engages the plurality of first limit switches to activate and deactivate the multiple light curtains positioned around the perimeter of the first welding cell and the second welding cell, and to activate and deactivate the light curtain positioned between the turntable and the front portion of the first welding cell and the front portion of the second welding cell.

15. The method of claim 14, wherein a plurality of proximity switches are provided between at least one of the multiple welding cells and the turntable, and wherein rotating the rotating portion of the turntable such that the at least one welding robot is aligned with the first welding cell includes:

rotating the rotating portion of the turntable;

engaging at least one of the plurality of proximity switches;

activating the at least one of the plurality of proximity switches;

detecting a position of the rotating part; and positioning the rotating part such that the at least one welding robot is aligned with the first welding cell.

16. The method of claim 15, wherein rotating the rotating portion of the turntable such that the at least one welding robot is aligned with the second welding cell includes:

rotating the rotating portion of the turntable;

engaging at least one of the plurality of proximity switches;

activating the at least one of the plurality of proximity switches;

detecting a position of the rotating part; and positioning the rotating part such that the at least one welding robot is aligned with the second welding cell.

17. The method of claim 16 further comprising:

programming a second welding process into a control system; and preparing a third welding cell and a fourth welding cell to perform the second welding process, wherein the second welding process includes a primary welding operation performed in the third welding cell; which is substantially different than the primary welding operation performed in the first welding cell, and a secondary welding operation performed in the fourth welding cell, which is substantially different than the secondary welding operation performed in the second welding cell.

* * * * *